US012731891B2

(12) United States Patent
He et al.

(10) Patent No.: US 12,731,891 B2
(45) Date of Patent: Sep. 8, 2026

(54) ANTENNA GEARBOX TRANSMISSION MECHANISM AND ANTENNA

(71) Applicant: HUAWEI TECHNOLOGIES CO., LTD., Shenzhen (CN)

(72) Inventors: Jinye He, Dongguan (CN); Jianbin Sang, Shenzhen (CN); Deyuan Kong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 305 days.

(21) Appl. No.: 18/344,335

(22) Filed: Jun. 29, 2023

(65) Prior Publication Data

US 2023/0352830 A1 Nov. 2, 2023

Related U.S. Application Data

(63) Continuation of application No. PCT/CN2020/141858, filed on Dec. 30, 2020.

(51) Int. Cl.
*H01Q 3/32* (2006.01)
*F16H 19/04* (2006.01)
*F16H 19/08* (2006.01)

(52) U.S. Cl.
CPC ............... *H01Q 3/32* (2013.01); *F16H 19/04* (2013.01); *F16H 19/08* (2013.01)

(58) Field of Classification Search
None
See application file for complete search history.

(56) References Cited

U.S. PATENT DOCUMENTS 11,201,402 B1 * 12/2021 Huangfu .................. H01P 1/18
11,984,662 B2 * 5/2024 Yin .......................... H01Q 3/32
(Continued)

FOREIGN PATENT DOCUMENTS

CN 103855471 A * 6/2014 .............. H01P 1/184
CN 105720370 A * 6/2016 .............. H01Q 3/32
(Continued)

OTHER PUBLICATIONS

Separate Definition, Merriam-Webster website, retrieved Oct. 2025 https://www.merriam-webster.com/dictionary/separate (Year: 2025).*
(Continued)

*Primary Examiner* — Dameon E Levi
*Assistant Examiner* — Anh Ho
(74) *Attorney, Agent, or Firm* — HAUPTMAN HAM, LLP

(57) ABSTRACT

This application provides an antenna gearbox transmission mechanism and an antenna. The antenna gearbox transmission mechanism includes a drive shaft, a first transmission structure, and a second transmission structure. The first transmission structure includes a first driving gear and a first driven gear set, the first driven gear set includes at least one first driven gear, the second transmission structure includes a second driving gear and a second driven gear, and both are in a transmission connection to the drive shaft. The first driven gear set is in a transmission connection to a first antenna array phase shifter, and the second driven gear is in a transmission connection to a second antenna array phase shifter. The first driving gear meshes with the first driven gear set, and when the second driving gear moves, the second driving gear meshes with or separates from the second driven gear.

20 Claims, 4 Drawing Sheets

(56) References Cited

U.S. PATENT DOCUMENTS

| | | | | |
|---|---|---|---|---|
| 2016/0064817 | A1 | 3/2016 | Liu et al. | |
| 2016/0134007 | A1* | 5/2016 | Ding | H01Q 1/1264<br>343/880 |
| 2020/0212565 | A1* | 7/2020 | Li | F16H 1/20 |

FOREIGN PATENT DOCUMENTS

| | | | | | |
|---|---|---|---|---|---|
| CN | 108365341 | A | * | 8/2018 | H01Q 3/02 |
| CN | 109326886 | A | | 2/2019 | |
| CN | 110931980 | A | | 3/2020 | |
| CN | 111180893 | A | * | 5/2020 | H01Q 3/36 |
| CN | 210692760 | U | | 6/2020 | |
| KR | 100374175 | B1 | | 3/2003 | |

OTHER PUBLICATIONS

Extended European Search Report issued in corresponding European Application No. 20967664.2, dated Dec. 5, 2023, pp. 1-11.

India Office Action issued in corresponding Indian Patent Application No. 202337043682, mailed on Feb. 13, 2026, pp. 1-8.

* cited by examiner

ANTENNA GEARBOX TRANSMISSION MECHANISM AND ANTENNA

CROSS-REFERENCE TO RELATED APPLICATIONS

This application is a continuation of International Application No. PCT/CN2020/141858, filed on Dec. 30, 2020, the disclosure of which is hereby incorporated by reference in its entirety.

TECHNICAL FIELD

This application relates to the field of antenna technologies, and in particular, to an antenna gearbox transmission mechanism and an antenna.

BACKGROUND

A radiating surface of a mobile communication antenna is adjusted based on a phase change of a radiating element of the antenna. A remote electrical tilt antenna is a mainstream antenna of the current mobile communication antenna. The remote electrical tilt antenna implements transmission control on a downtilt angle of the antenna through a mutual operation between a control unit and a mechanical transmission device.

Currently, in a multiple-input multiple-output (multiple-input multiple-output, MIMO) mobile communication antenna system, phase adjustment on an upper array and a lower array of a phase shifter is controlled by separately driving two drive motors. The two drive motors increase costs of the mobile communication antennas, and use of dual-drive motors has a problem of a complex and difficult layout.

SUMMARY

Embodiments of this application provide an antenna gearbox transmission mechanism and an antenna, to resolve a problem of difficulty in a layout of dual-drive motors, and implement a function of controlling phase adjustment on an upper array and a lower array of the antenna through transmission of a single motor.

To achieve the foregoing objective, the following technical solutions are used in this application.

According to a first aspect, an antenna gearbox transmission mechanism is provided. The transmission mechanism includes a drive shaft, a first transmission structure, and a second transmission structure. The first transmission structure includes a first driving gear and a first driven gear set, the first driven gear set includes at least one first driven gear, the second transmission structure includes a second driving gear and a second driven gear, and both the first driving gear and the second driving gear are in a transmission connection to the drive shaft. The first driven gear set is configured to be in a transmission connection to a first antenna array phase shifter, and the second driven gear is configured to be in a transmission connection to a second antenna array phase shifter. The first driving gear meshes with the first driven gear set, and when the second driving gear moves, the second driving gear meshes with or separates from the second driven gear.

In this embodiment of this application, the first transmission structure and the second transmission structure are disposed, the first driven gear set in the first transmission structure is in a transmission connection to the first antenna array phase shifter on the antenna, and the second driven gear in the second transmission structure is in a transmission connection to the second antenna array phase shifter on the antenna, to implement independent control on the first antenna array phase shifter and the second antenna array phase shifter. The first driving gear and the second driving gear are in a transmission connection to a same drive shaft, to control phase adjustment of the first antenna array phase shifter and the second antenna array phase shifter through a single drive motor. The first driving gear is disposed to mesh with the first driven gear set, and the second driving gear is disposed to mesh with or separate from the second driven gear, so that the first driving gear can transmit all of power of the drive shaft to the first driven gear set, and the second driving gear can transmit a part of the power of the drive shaft to the second driven gear when meshing with the second driven gear. In this way, the single drive motor implements control on independent phase adjustment amplitudes of the first antenna array phase shifter and the second array phase shifter. To be specific, the single drive motor controls the first antenna array phase shifter and the second array phase shifter to perform different phase adjustments.

In a possible implementation of the first aspect, some gear teeth are disposed on the second driving gear, and all gear teeth are disposed on the second driven gear.

On this basis, some gear teeth are disposed on the second driving gear, so that the second driving gear partially meshes with the second driven gear, and when the second driving gear moves, the second driving gear meshes with or separates from the second driven gear.

In a possible implementation of the first aspect, when the drive shaft rotates in a preset direction, the first driven gear rotates in a forward direction and a reverse direction, and the second driven gear rotates in a forward direction or a reverse direction.

On this basis, the first driven gear may be disposed to rotate in a forward direction and a reverse direction, so that bidirectional adjustment can be performed on the first antenna array phase shifter connected to the first transmission structure when the drive shaft rotates in one direction. The second driven gear is disposed to rotate in a forward direction or a reverse direction, so that when the drive shaft rotates in one direction, unidirectional adjustment can be performed on the second antenna array phase shifter connected to the second transmission structure.

In a possible implementation of the first aspect, both the first driving gear and the second driving gear are racks, and the first driving gear and the second driving gear move synchronously and linearly. A rack length of the first driving gear is greater than a rack length of the second driving gear.

On this basis, both the first driving gear and the second driving gear are set as racks, and when the drive shaft rotates, the first driving gear and the second driving gear are driven to move synchronously and linearly, to control motions of the first antenna array phase shifter and the second antenna array phase shifter conveniently. The rack length of the first driving gear is set to be greater than the rack length of the second driving gear, so that a phase adjustment amplitude of the first antenna array phase shifter can be greater than a phase adjustment amplitude of the second antenna array phase shifter. Therefore, independent adjustment of different antenna array phase shifters is implemented, and adjustment amplitudes of the different antenna array phase shifters are controlled.

In a possible implementation of the first aspect, the first driving gear is a rectangular rack, and a forward rack and a reverse rack are disposed on the rectangular rack. A forward rack or a reverse rack is disposed on the second driving gear.

On this basis, the first driving gear is set as a rectangular rack, and the forward rack and the reverse rack are advantageously disposed. The forward rack and the reverse rack are disposed, and the first driven gear advantageously rotates in the forward direction and the reverse direction. Therefore, bidirectional adjustment of the first antenna array phase shifter is implemented. One of the forward rack or the reverse rack is disposed on the second driving gear, so that when the drive shaft rotates unidirectionally, the second driven gear also rotates unidirectionally, thereby implementing unidirectional adjustment on the second antenna array phase shifter.

In a possible implementation of the first aspect, the first driving gear and the second driving gear are integrally formed.

On this basis, the first driving gear and the second driving gear are integrally formed, synchronous movement of the first driving gear and the second driving gear is advantageously implemented. At the same time, the drive shaft drives one of the gears to move. To be specific, synchronous movement of the first driving gear and the second driving gear can be implemented, a connection structure is simplified, and a layout can be simpler.

In a possible implementation of the first aspect, a connecting block is disposed on the first driving gear and/or the second driving gear, and the connecting block is threadedly connected to the drive shaft.

On this basis, the connecting block is disposed on the first driving gear and/or the second driving gear, the connecting block is threadedly connected to the drive shaft, and when the drive shaft rotates, the connecting block can move linearly along an axis of the drive shaft, so that the first driving gear and/or the second driving gear are driven to perform linear movement. When the first driving gear and the second driving gear are connected together or integrally formed, only a connecting block is disposed on one of the driving gears, so that the first driving gear and the second driving gear can synchronously perform linear movement.

In a possible implementation of the first aspect, the first driven gear set includes two first driven gears. The two first driven gears are disposed symmetrically relative to a center of the first driving gear. A half-circle of gear teeth meshing with the first driven gear are disposed on the first driving gear. A total length of the gear teeth meshing with the second driven gear on the second driving gear is less than a circumference of the second driving gear.

On this basis, two first driven gears are symmetrically disposed on two sides of the first driving gear, and a half-circle of the gear teeth are disposed on the first driving gear, so that the first driving gear meshes with only one of the first driven gears, and when the first driving gear rotates for one circle, one of the first driven gears rotates in the forward direction and the other first driven gear rotates in the reverse direction. The total length of the gear teeth meshing with the second driven gear on the second driving gear is less than the circumference of the second driving gear, that is, some gear teeth are disposed the second driving gear, and the second driven gear partially meshes with the second driving gear. When the second driving gear rotates for one circle, a part on which no gear teeth are disposed cannot drive the second driven gear to rotate, so that a phase adjustment amplitude of the second antenna array phase shifter is controlled, and the second driving gear partially meshes with the second driven gear. When the second driving gear rotates in a particular direction, only the second driven gear can be driven to rotate unidirectionally.

In a possible implementation of the first aspect, the first driving gear and the second driving gear have a same specification.

On this basis, the first driving gear and the second driving gear are set to have a same specification, a layout is convenient, and an adjustment amplitude of the array phase shifter is easily controlled.

In a possible implementation of the first aspect, both the first driven gear and the second driven gear are bevel gears.

The first driven gear and the second driven gear are set as bevel gears, the first driven gear and the second driven gear can better cooperate with the corresponding first driving gear and the second driving gear, and the bevel gear can change a transmission direction of power, to facilitate a structural layout based on positions of the drive shaft and the array phase shifter.

In a possible implementation of the first aspect, transmission between both the first driving gear and the second driving gear and the drive shaft is implemented through a worm gear.

The transmission between the drive shaft and the first driving gear and the drive shaft and the second driving gear is implemented through transmission of the worm gear. This arrangement is conducive to fully using space and changing the transmission direction of the power.

In a possible implementation of the first aspect, the first transmission structure includes a first transmission shaft, and the first transmission shaft is in a transmission connection to the first driven gear set. The second transmission structure includes a second transmission shaft, and the second transmission shaft is in a transmission connection to the second driven gear. One or more pairs of output gears are disposed on the first transmission shaft, and one or more pairs of output gears are disposed on the second transmission shaft.

On this basis, the first transmission shaft is disposed, and an output gear is disposed on the first transmission shaft, so that the output gear meshes with the first antenna array phase shifter, to transmit power of the first driven gear set to the first antenna array phase shifter. The second transmission shaft is disposed, and an output gear is disposed on the second transmission shaft, so that the output gear meshes with the second antenna array phase shifter, to transmit power of the second driven gear to the second antenna array phase shifter.

According to a second aspect, an antenna is provided. The antenna includes a first antenna array phase shifter, a second antenna array phase shifter, and the antenna gearbox transmission mechanism according to the first aspect. The first antenna array phase shifter is in a transmission connection to a first driven gear set, and the second antenna array phase shifter is in a transmission connection to a second driven gear. The foregoing antenna has a same technical effect as the antenna gearbox transmission mechanism according to the foregoing embodiment, and details are not described herein again.

Figure 1:
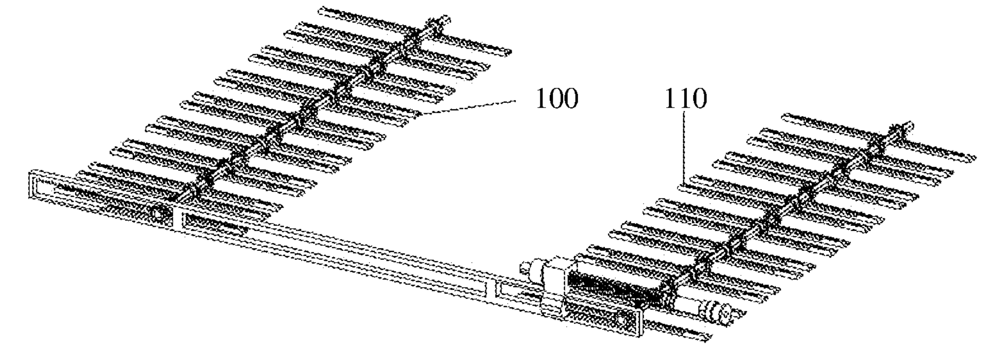
FIG. 1 is a first schematic diagram of an application scenario of an antenna gearbox transmission mechanism according to an embodiment of this application.

In the figures: 10—drive shaft; 20—first driving gear; 201—forward rack; 202—reverse rack; 21—first turbine; 22—first driving gear teeth; 30—second driving gear; 31—second turbine; 32—second driving gear teeth; 40—first driven gear; 50—second driven gear; 60—first transmission shaft; 70—second transmission shaft; 80—output gear; 90—connecting block; 100—first antenna array phase shifter; 110—second antenna array phase shifter; 120—worm; 131—first upper fixing base; 132—first lower fixing base; 141—second upper fixing base; 142—second lower fixing base.

DESCRIPTION OF EMBODIMENTS

The following describes technical solutions of this application with reference to accompanying drawings.

In embodiments of this application, the terms such as "example" or "for example" are used to represent giving an example, an illustration, or a description. Any embodiment or design solution described as "example" or "for example" in embodiments of this application should not be interpreted as being more preferred or having more advantages than another embodiment or design solution. Exactly, use of the words such as "example" or "for example" is intended to present a relative concept in a specific manner.

In embodiments of this application, the terms "first" and "second" are used merely for the purpose of description, and cannot be construed as indicating or implying relative importance, or implying a quantity of indicated technical features. Therefore, a feature limited by "first" or "second" may explicitly or implicitly include one or more features.

It should be understood that the terms used in the description of the various examples herein are merely intended to describe specific examples and are not intended to be restrictive. "One" ("a" and "an") and "the" of singular forms used in the descriptions of the various examples and the appended claims are also intended to include plural forms, unless otherwise specified in the context clearly.

In this application, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c may represent: a, b, c, a-b, a-c, b-c, or a-b-c, where a, b, and c may be one or more.

It should also be understood that the term "and/or" as used herein refers to and covers any and all possible combinations of one or more of the associated listed items. The term "and/or" is an association relationship that describes associated objects, and represents that three relationships may exist. For example, A and/or B may represent the following three cases: Only A exists, both A and B exist, and only B exists. In addition, the character "/" in this application usually indicates that the associated objects are in an "or" relationship.

It should be understood that determining B based on A does not mean that B is determined only based on A, and B may also be determined based on A and/or other information.

It should further be understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or groups thereof not excluded.

It should be understood that "one embodiment", "one embodiment", and "a possible implementation" mentioned throughout the specification mean that a specific feature, structure, or characteristic related to the embodiment or implementation is included in at least one embodiment of this application. Therefore, "in an embodiment", "in an embodiment of this application", or "a possible implementation" appearing throughout this specification may not necessarily refer to a same embodiment. Furthermore, these specific features, structures, or characteristics may be combined in one or more embodiments in any suitable manner.

To resolve a problem of difficulty in a layout of dual-drive motors in the conventional technology, an embodiment of this application provides an antenna gearbox transmission mechanism, to implement a phase adjustment function of controlling an upper array and a lower array of an antenna through transmission of a single motor. The following describes embodiments of this application with reference to FIG. 1 to FIG. 5.

Figure 2:
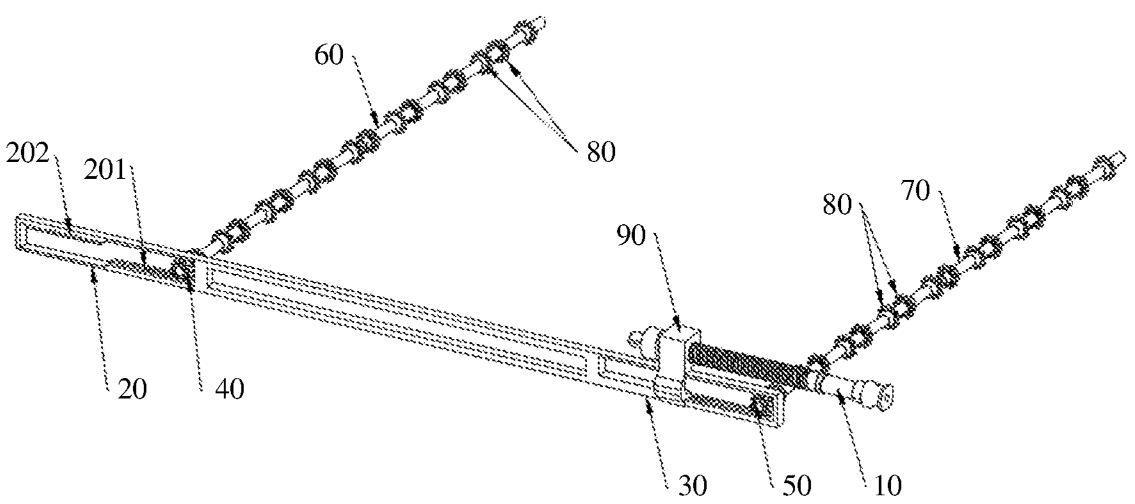
FIG. 2 is a first schematic diagram of a structure of an antenna gearbox transmission mechanism according to an embodiment of this application.
Figure 3:
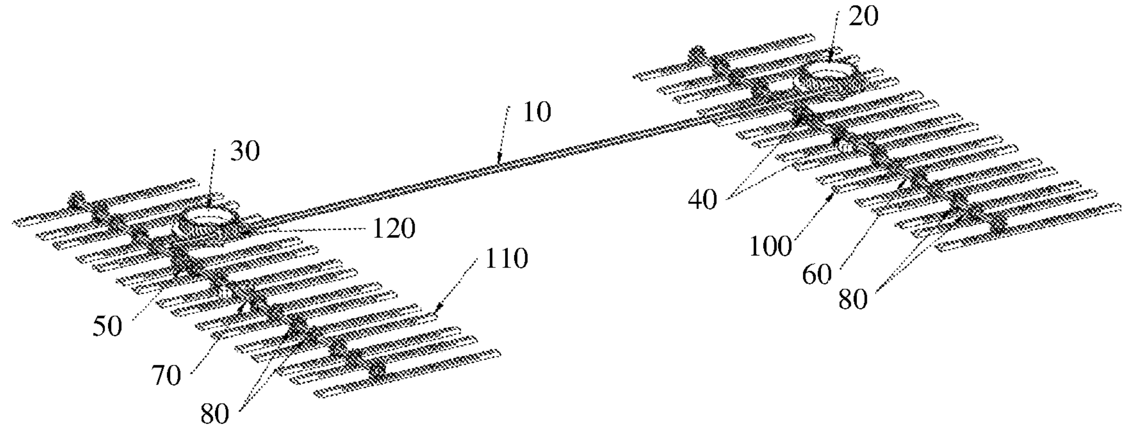
FIG. 3 is a second schematic diagram of a structure and a second schematic diagram of an application scenario of an antenna gearbox transmission mechanism according to an embodiment of this application.

Refer to FIG. 1, FIG. 2, and FIG. 3. FIG. 1 is a first schematic diagram of an application scenario of an antenna gearbox transmission mechanism according to an embodiment of this application. FIG. 2 is a first schematic diagram of a structure of an antenna gearbox transmission mechanism according to an embodiment of this application. The antenna gearbox transmission mechanism shown in FIG. 2 is applied to the application scenario provided in FIG. 1. FIG. 3 is a second schematic diagram of a structure and a second schematic diagram of an application scenario of an antenna gearbox transmission mechanism according to an embodiment of this application.

As shown in FIG. 1, FIG. 2, and FIG. 3, in an embodiment of this application, an antenna gearbox transmission mechanism is provided. The transmission mechanism includes a drive shaft 10, a first transmission structure and a second transmission structure. The first transmission structure includes a first driving gear 20 and a first driven gear set. The first driven gear set includes at least one first driven gear 40.

In this embodiment of this application, in a case that the first driven gear set includes one first driven gear 40 and two first driven gears 40, setting of a quantity of the first driven gears may be determined based on an actual layout requirement and a motion requirement of the first antenna array phase shifter 100. The first driving gear 20 is in a transmission connection to the drive shaft 10. The drive shaft 10 is a power output shaft of a drive motor. The first driving gear meshes with the first driven gear set, so that power of the drive motor can be transmitted to the first driven gear set. The first driven gear set transmits power to the first antenna array phase shifter 100 through the transmission structure.

It should be noted that, meshing of the first driving gear 20 with the first driven gear set means that the first driving gear 20 meshes with the first driven gear 40 in the first driven gear set. When the first driven gear set includes only one first driven gear 40, the first driving gear 20 meshes with the first driven gear 40. When the first driven gear set includes a plurality of first driven gears 40, the first driving gear 20 meshes with one of the first driven gears 40 in the first driven gear set.

The second transmission structure includes a second driving gear 30 and a second driven gear 50. The second driven gear 50 is configured to be in a transmission connection to a second antenna array phase shifter 110. The second driving gear 30 is in a transmission connection to the drive shaft 10, to transmit power of the drive motor to the second driving gear 30. When the second driving gear 30 moves, the second driving gear 30 meshes with or separates from the second driven gear 50.

It should be noted that, that the second driving gear 30 meshes with or separates from the second driven gear 50 means that when the second driving gear 30 moves, the second driven gear 50 and the second driving gear 30 are not always meshed, but are constantly switched between a meshed state and a separated state. To be specific, the second driving gear 30 and the second driven gear 50 are partially meshed. Therefore, when the second driven gear 50 is in a transmission connection to the second antenna array phase shifter 110 through the transmission structure, only a part of power of the drive motor can be transmitted to the second antenna array phase shifter 110.

In this embodiment of this application, the first transmission structure and the second transmission structure are mainly implemented in a form of gear transmission, but implementation forms of the first transmission structure and the second transmission structure are not limited. Equivalent transformation may also be performed in a manner of one or a combination of gear transmission, chain transmission, or belt transmission.

The antenna gearbox transmission mechanism in this embodiment of this application is mainly applied to an antenna, and is configured to transmit power of a drive motor to an antenna array phase shifter in the antenna. The antenna in this embodiment of this application includes a first antenna array phase shifter 100 and a second antenna array phase shifter 110. The first driven gear set in the first transmission structure is configured to be in a transmission connection to the first antenna array phase shifter 100. The second driven gear 50 in the second transmission structure is configured to be in a transmission connection to the second antenna array phase shifter 110. The first transmission structure and the second transmission structure are two independent transmission structures. Power sources of the first transmission structure and the second transmission structure may be a same drive motor.

In this embodiment of this application, the first transmission structure and the second transmission structure are disposed, the first driven gear set in the first transmission structure is in a transmission connection to the first antenna array phase shifter 100 on the antenna, and the second driven gear 50 in the second transmission structure is in a transmission connection to the second antenna array phase shifter 110 on the antenna, to implement independent control on the first antenna array phase shifter 100 and the second antenna array phase shifter 110. The first driving gear 20 and the second driving gear 30 are in a transmission connection to a same drive shaft 10, so that only one drive motor can be disposed to drive the first transmission structure and the second transmission structure to move independently, thereby driving the first antenna array phase shifter 100 and the second antenna array phase shifter 110 to perform independent phase adjustment. The first driving gear 20 is disposed to mesh with the first driven gear set, and the second driving gear 30 is disposed to mesh with or separate from the second driven gear 50, so that the first driving gear 20 can transmit all power of the drive shaft 10 to the first driven gear set. The second driving gear 30 can transmit a part of the power of the drive shaft 10 to the second driven gear 50 when meshing with the second driven gear 50, thereby implementing control of independent phase adjustment amplitudes of the first antenna array phase shifter 100 and the second array phase shifter by the single drive motor. To be specific, the single-drive motor controls the first antenna array phase shifter 100 and the second array phase shifter to perform different phase adjustment.

In this embodiment of this application, power transmission may be implemented between the first driven gear set and the first antenna array phase shifter 100 in a gear transmission manner. Power transmission may also be implemented between the second driven gear 50 and the second antenna array phase shifter 110 in a gear transmission manner. In addition to the gear transmission manner, power transmission may also be performed between the first driven gear set and the first antenna array phase shifter 100, and between the second driven gear 50 and the second antenna array phase shifter 110 in other manners, such as chain transmission and belt transmission, or in a combination of a plurality of transmission manners, such as a combination of gear transmission and chain transmission, or a combination of gear transmission and belt transmission. Persons skilled in the art can perform selection or combination based on design and layout requirements. The following uses gear transmission as an example to describe a form of power transmission between the first driven gear set and the first antenna array phase shifter 100 and between the second driven gear 50 and the second antenna array phase shifter 110 in this embodiment of this application.

As shown in FIG. 1 or FIG. 3, the first driven gear 40 in the first driven gear set is fixed on a first transmission shaft 60, and an output gear 80 that cannot rotate relative to the first transmission shaft 60 is disposed on the first transmission shaft 60. To be specific, the output gear 80 can be fixedly disposed on the first transmission shaft 60. Gear teeth meshing with the output gears 80 on the first transmission shaft 60 are disposed on the first antenna array phase shifter 100. A quantity of output gears 80 on the first transmission shaft 60 corresponds to a quantity of phase shifters in the first antenna array phase shifter 100. When the first driven gear 40 rotates, the first driven gear 40 drives the first transmission shaft 60 to rotate, the first transmission shaft 60 drives the output gear 80 on the first transmission shaft to rotate, and the output gear 80 meshes with the first antenna array phase shifter 100. The first antenna array phase shifter 100 is slidably connected to a supporting apparatus of the antenna. Therefore, the rotating output gear 80 drives the first antenna array phase shifter 100 to slide forward and backward, to implement phase adjustment.

As shown in FIG. 1 or FIG. 3, the second driven gear 50 is fixed on a second transmission shaft 70, and an output gear 80 that cannot rotate relative to the second transmission shaft 70 is disposed on the second transmission shaft 70. To be specific, the output gear 80 can be fixedly disposed on the second transmission shaft 70. Gear teeth meshing with output gears 80 on the second transmission shaft 70 are disposed on the second antenna array phase shifter 110. A quantity of output gears 80 on the second transmission shaft 70 corresponds to a quantity of phase shifters in the second antenna array phase shifter 110. When the second driven gear 50 rotates, the second driven gear 50 drives the second transmission shaft 70 to rotate, the second transmission shaft 70 drives the output gear 80 on the second transmission shaft to rotate, and the output gear 80 meshes with the second antenna array phase shifter 110. The second antenna array phase shifter 110 is slidably connected to the supporting apparatus of the antenna. Therefore, the rotating output gear 80 drives the second antenna array phase shifter 110 to slide forward and backward, to implement phase adjustment.

In an embodiment of this application, some gear teeth are disposed on the second driving gear 30, so that the second driving gear 30 and the second driven gear 50 are partially meshed. In this way, when the second driving gear 30 moves, the second driving gear 30 meshes with or separates from the second driven gear 50. Because the second driven gear 50 is driven by the second driving gear 30 and has no power, all gear teeth are usually disposed on the second driven gear 50, to ensure that the second driven gear 50 can mesh with a part in which the gear teeth are disposed on the second driving gear 30, and implement partial transmission of power.

In an embodiment of this application, when the drive shaft 10 rotates in a preset direction, the first driven gear 40 rotates in a forward direction and a reverse direction, and the second driven gear 50 rotates in a forward direction or a reverse direction.

It should be noted that, when the drive shaft 10 rotates in the preset direction, the first driven gear 40 rotates in a forward direction and a reverse direction, to be specific, the first driven gear 40 first rotates in a forward direction, and then rotates in a reverse direction. Alternatively, the first driven gear 40 rotates in the reverse direction and then rotates in the forward direction. The second driven gear 50 rotates in a forward direction or a reverse direction, to be specific, when the drive shaft 10 rotates only in one direction, the second driven gear 50 only rotates unidirectionally, and the unidirectional movement may be a forward movement or a reverse movement.

In this embodiment of this application, the first driven gear 40 can be disposed to rotate in a forward direction and a reverse direction, so that when the drive shaft 10 rotates in one direction, bidirectional adjustment can be performed on the first antenna array phase shifter 100 connected to the first transmission structure. To be specific, the first antenna array phase shifter 100 can perform reciprocating movement to implement phase adjustment. The second driven gear 50 is disposed to rotate in a forward direction or a reverse direction, so that when the drive shaft rotates in one direction, unidirectional adjustment can be performed on the second antenna array phase shifter 110 connected to the second transmission structure. To be specific, the second antenna array phase shifter 110 moves in one direction.

In an embodiment of this application, refer to FIG. 2. FIG. 2 is a first schematic diagram of a structure of an antenna gearbox transmission mechanism according to an embodiment of this application. As shown in FIG. 2, both the first driving gear 20 and the second driving gear 30 are racks, and the first driving gear 20 and the second driving gear 30 move synchronously and linearly. A rack length of the first driving gear 20 is greater than a rack length of the second driving gear 30.

In this embodiment of this application, both the first driving gear 20 and the second driving gear 30 are set in a rack form. Because both the first driving gear 20 and the second driving gear 30 are in a transmission connection to the drive shaft 10, the first driving gear 20 and the second driving gear 30 can be driven to move synchronously when the drive shaft 10 rotates. Both the first driving gear 20 and the second driving gear 30 are racks. Therefore, a motion form of the first driving gear 20 and the second driving gear 30 is set to be linear motion, to facilitate movement of the first driven gear set and the second driven gear 50.

Both the first driving gear 20 and the second driving gear 30 are set to be racks, so that when the drive shaft 10 rotates, the first driving gear 20 and the second driving gear 30 are driven to perform linear movement synchronously, thereby facilitating control of movement of the first antenna array phase shifter 100 and the second antenna array phase shifter 110. The rack length of the first driving gear 20 is greater than the rack length of the second driving gear 30, so that a phase adjustment amplitude of the first antenna array phase shifter 100 can be greater than a phase adjustment amplitude of the second antenna array phase shifter 110. Therefore, independent adjustment of different antenna array phase shifters is implemented, and adjustment amplitudes of the different antenna array phase shifters are controlled.

In an embodiment of this application, the first driving gear 20 and the second driving gear 30 are integrally formed. As shown in FIG. 2, both the first driving gear 20 and the second driving gear 30 are set as racks, and both the first driving gear 20 and the second driving gear 30 are driven by the drive shaft 10 to perform linear movement synchronously. Therefore, the first driving gear 20 and the second driving gear 30 can be integrally formed, so that in such arrangement, production efficiency of the first driving gear 20 and the second driving gear 30 can be improved, to facilitate synchronous movement of the first driving gear 20 and the second driving gear 30. In addition, a connection structure when the first driving gear 20 and the second driving gear 30 are in a transmission connection to the drive shaft 10 can be simplified. The drive shaft 10 can drive the first driving gear 20 and the second driving gear 30 to move synchronously through one transmission connection structure, so that a layout can be simplified.

In an embodiment of this application, a connecting block 90 is disposed on the first driving gear 20 and/or the second driving gear 30, and the connecting block 90 is threadedly connected to the drive shaft 10. The first driving gear 20 and the second driving gear 30 can be in a transmission connection to the drive shaft 10 in a plurality of forms, for example, gear transmission, chain transmission, belt transmission, or thread transmission. In this embodiment of this application, both the first driving gear 20 and the second driving gear 30 are in a rack form. Therefore, in this embodiment, transmission connection is performed in a form of thread transmission. Specifically, an external thread is disposed on the drive shaft 10. A connecting block 90 is disposed on the first driving gear 20 and/or the second driving gear 30. An internal thread matched with the external thread on the drive shaft 10 is disposed on the connecting block 90. A design of the threads requires that the connecting block 90 move forward and backward along an axis of the drive shaft 10 when the drive shaft 10 rotates.

When the first driving gear 20 and the second driving gear 30 are designed to be integrally formed, a connecting block 90 is disposed on the first driving gear 20 or the second driving gear 30, so that the drive shaft 10 can drive the first driving gear 20 and the second driving gear 30 to perform synchronous linear movement along the axis of the drive shaft 10. When the first driving gear 20 and the second driving gear 30 are two independent gears, a connecting block 90 can be disposed on each of the first driving gear 20 and the second driving gear 30, and the two connecting blocks 90 are threadedly connected to the drive shaft 10. The drive shaft 10 may also drive the first driving gear 20 and the second driving gear 30 to perform synchronous linear movement along the axis of the drive shaft 10.

In an embodiment of this application, the first driving gear 20 is a rectangular rack, and a forward rack 201 and a reverse rack 202 are disposed on the rectangular rack. A forward rack or a reverse rack is disposed on the second driving gear 30.

As shown in FIG. 2, in this embodiment of this application, the first driven gear set includes one first driven gear 40. The forward rack 201 and the reverse rack 202 are disposed on the first driving gear 20, and the forward rack 201 and the reverse rack 202 are located on an upper side and a lower side of an inner side of the rectangular rack respectively. Only a forward rack or a reverse rack is disposed on the second driving gear 30. To be specific, a rack is disposed only on one side. The rack length of the first driving gear 20 includes a length of the forward rack 201 and a rack length of the reverse rack 202. Because the rack length of the first driving gear 20 is greater than the rack length of the second driving gear 30, when movement strokes of the first driving gear and the second driving gear 30 are equal to the rack length of the first driving gear 20, the second driven gear 50 is in a stopped state during a part of the stroke of the second driving gear 30. The following describes moving states of the first driving gear 20 and the first driven gear set, and the second driving gear 30 and the second driven gear 50, using an example in which the rack length of the second driving gear 30 is equal to the length of the forward rack 201 of the first driving gear 20.

As shown in FIG. 2, a direction of the first driving gear 20 close to the drive shaft 10 is set to downward, and a direction of the first driving gear 20 away from the drive shaft 10 is set to upward. When the drive shaft 10 rotates in the preset direction, the connecting block 90 threadedly connected to the drive shaft 10 is driven to move downward linearly along the axis of the drive shaft 10, and the connecting block 90 drives the first driving gear 20 and the second driving gear 30 to move downward linearly along the axis of the drive shaft 10. Rotation of the drive shaft 10 can be controlled, so that the movement strokes of the first driving gear 20 and the second driving gear 30 are the rack length of the first driving gear 20. During a downward movement of the first driving gear 20, the first driven gear 40 first meshes with the forward rack 201 to drive the first transmission shaft 60 to rotate anticlockwise, and then the first driven gear meshes with the reverse rack 202 to drive the first transmission shaft 60 to rotate clockwise. The first transmission shaft 60 drives, through the output gear 80 fixedly disposed on the first transmission shaft, the first antenna array phase shifter 100 to move upward and downward, to implement phase adjustment of the antenna. At the same time, during a downward movement of the second driving gear 30, the second driven gear 50 meshes with the gear teeth on the second driving gear 30, the second driving gear 30 drives the second driven gear 50 to rotate clockwise or anticlockwise, and the second driven gear 50 drives the second transmission shaft 70 to rotate. The second transmission shaft 70 drives, through the output gear 80 fixedly disposed on the second transmission shaft, the second antenna array phase shifter 110 to move. Because the second driven gear 50 rotates in one direction, the second antenna array phase shifter 110 moves in only one direction. A rotation direction of the second driven gear 50 depends on whether a rack disposed on the second driving gear 30 is a forward rack or a reverse rack.

The rack length of the second driving gear 30 is equal to the length of the forward rack 201 of the first driving gear 20. Therefore, when the movement stroke of the second driving gear exceeds the length of the forward rack 201, no gear teeth meshing with the second driven gear 50 are on the second driving gear 30, so that the second driven gear 50 is in a stopped state, and the second antenna array phase shifter 110 is also stopped to move. However, the first driving gear and the first driven gear 40 are always in a meshing state, and the first driven gear 40 is driven to rotate continuously, to adjust a position of the first antenna array phase shifter 100.

It should be noted that, a rotation direction of the drive shaft 10 can be adjusted, for example, the drive shaft 10 can be adjusted to rotate in a direction opposite to the preset direction, so that positions of the first antenna array phase shifter 100 and the second antenna array phase shifter 110 may be reversely adjusted, to reversely adjust a phase change of the antenna.

In this embodiment of this application, the first driving gear 20 is set as a rectangular rack, to facilitate arrangement of the forward rack 201 and the reverse rack 202. The forward rack 201 and the reverse rack 202 are disposed, to facilitate forward rotation and reverse rotation of the first driven gear 40, and implement bidirectional adjustment of the first antenna array phase shifter 100. One of the forward rack or the reverse rack is disposed on the second driving gear 30, so that when the drive shaft 10 rotates unidirectionally, the second driven gear 50 also rotates unidirectionally, thereby implementing unidirectional adjustment on the second antenna array phase shifter 110.

Figure 4:
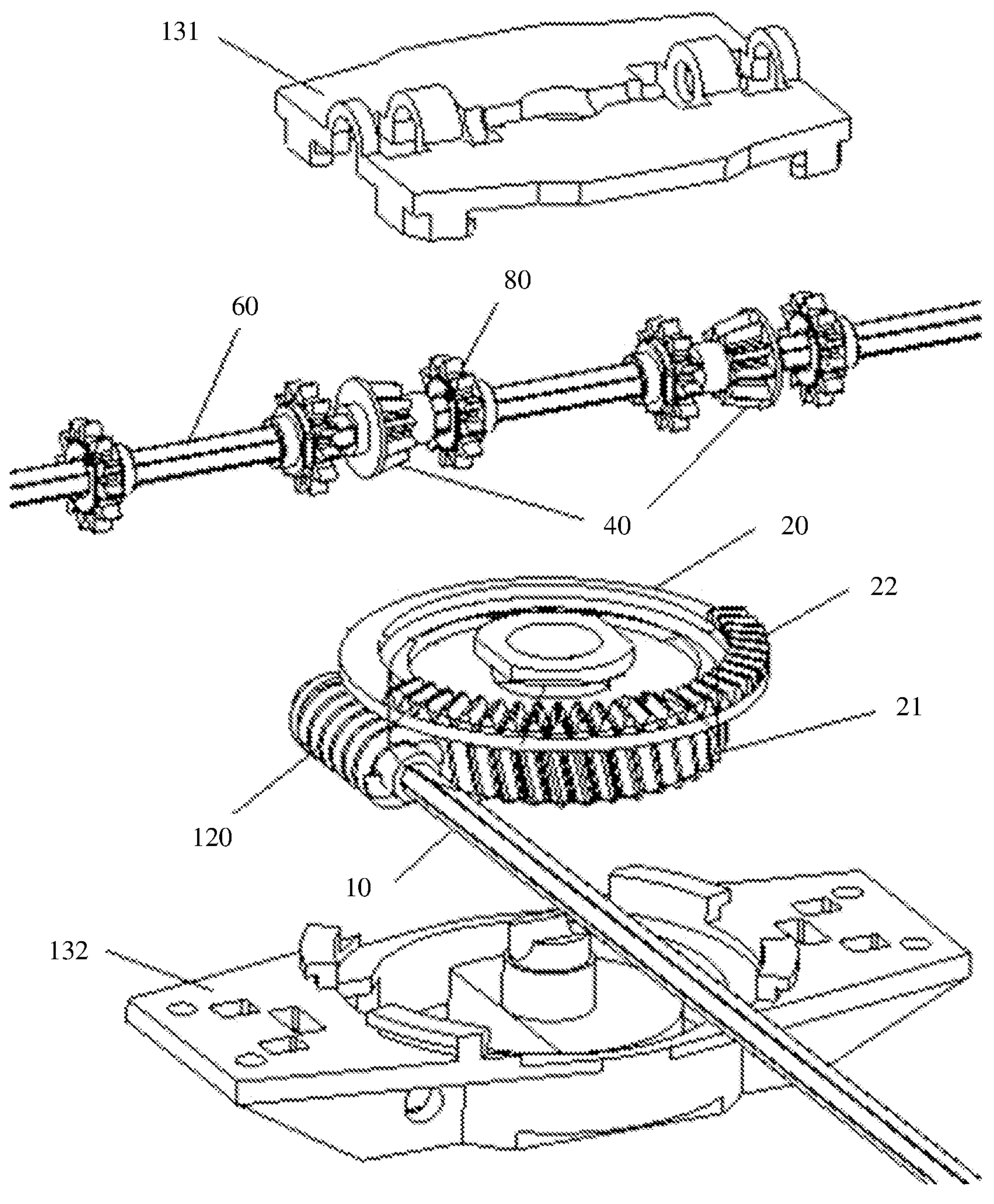
FIG. 4 is a schematic exploded view of a first transmission structure in an antenna gearbox transmission mechanism shown in FIG. 3.
Figure 5:
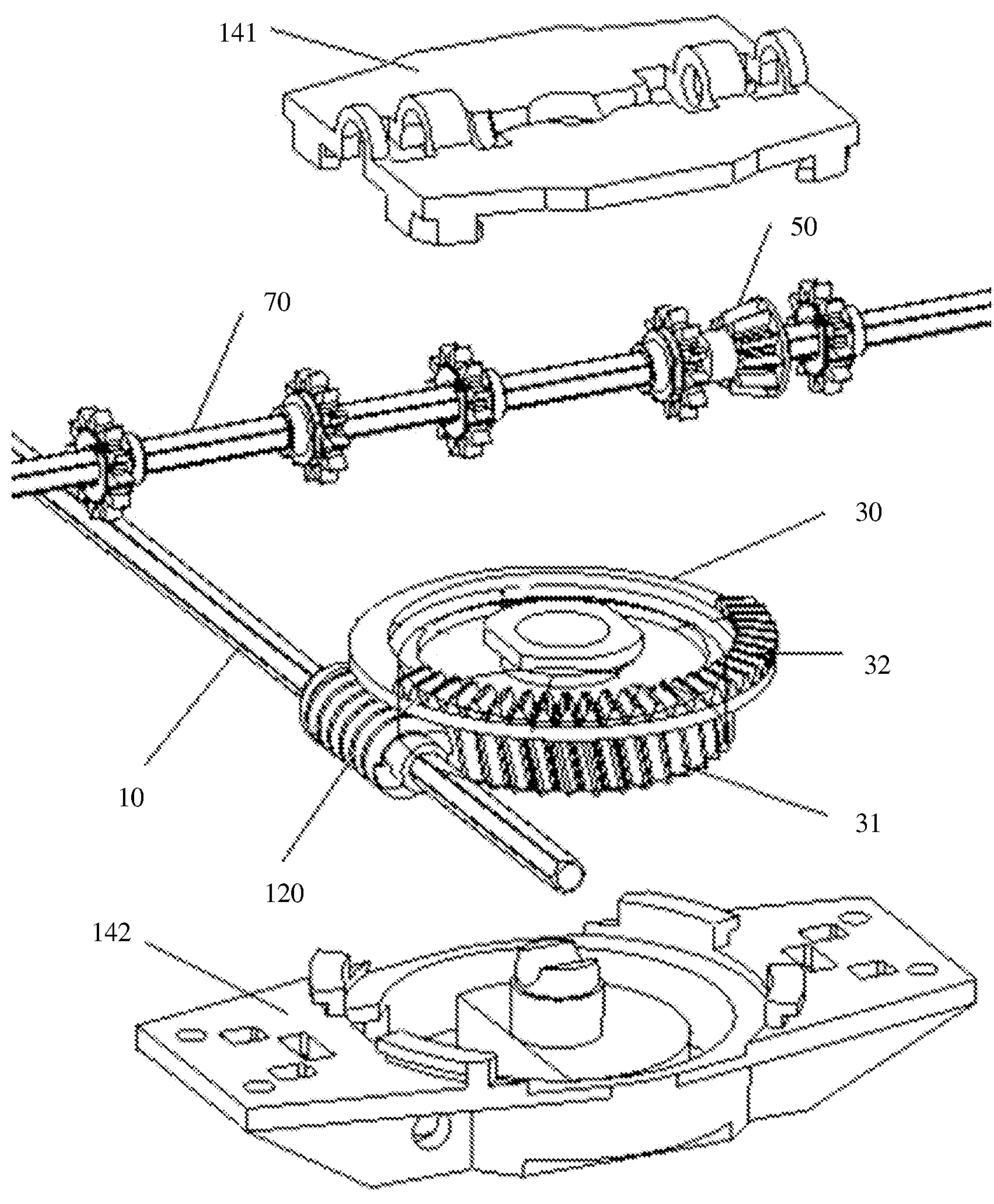
FIG. 5 is a schematic exploded view of a second transmission structure in an antenna gearbox transmission mechanism shown in FIG. 3.

Refer to FIG. 3, FIG. 4, and FIG. 5. FIG. 3 is a second schematic diagram of a structure and a second schematic diagram of an application scenario of an antenna gearbox transmission mechanism according to an embodiment of this application. FIG. 4 is an exploded schematic diagram of a first transmission structure in an antenna gearbox transmission mechanism shown in FIG. 3. FIG. 5 is a schematic exploded view of a second transmission structure in an antenna gearbox transmission mechanism shown in FIG. 3. As shown in FIG. 3, FIG. 4, and FIG. 5, in an embodiment of this application, the first driven gear set includes two first driven gears 40, and the two first driven gears 40 are symmetrically disposed relative to a center of the first driving gear 20. A half-circle of gear teeth meshing with the first driven gear 40 are disposed on the first driving gear 20. A total length of the gear teeth meshing with the second driven gear 50 on the second driving gear 30 is less than a circumference of the second driving gear 30.

A half-circle of gear teeth meshing with the first driven gear 40 are disposed on the first driving gear 20. Then two first driven gears are disposed on two sides of the first driving gear 20. The two first driven gears are symmetrically disposed relative to the center of the first driving gear. When the first driving gear 20 rotates for one cycle, the first driving gear 20 meshes with the two first driven gears separately. Because the two first driven gears 40 are disposed on two sides of the first driving gear 20, rotation directions of the two first driven gears 40 are opposite. Because the total length of the gear teeth meshing with the second driven gear 50 on the second driving gear is less than the circumference of the second driving gear 30, that is, when the second driving gear 30 rotates for one cycle, the second driving gear 30 partially meshes with the second driven gear 50.

In this embodiment of this application, two first driven gears 40 are symmetrically disposed on two sides of the first driving gear 20, and a half-circle of gear teeth are disposed on the first driving gear 20, so that the first driving gear 20 meshes with only one of the first driven gears 40. When the first driving gear 20 rotates for one circle, one of the first driven gears 40 rotates in the forward direction and the other first driven gear 40 rotates in the reverse direction. The total length of the gear teeth meshing with the second driven gear 50 on the second driving gear 30 is set to be less than the circumference of the second driving gear 30, to be specific, some gear teeth are disposed on the second driving gear 30, and the second driven gear 50 partially meshes with the second driving gear 30. When the second driving gear 30 rotates for one circle, a part in which no gear teeth are disposed cannot drive the second driven gear 50 to rotate, to implement control of the phase adjustment amplitude of the second antenna array phase shifter 110. When the second driving gear 30 partially meshes with the second driven gear 50, and the second driving gear 30 rotates in a particular direction, only the second driven gear 50 can be driven to rotate unidirectionally.

The antenna gearbox transmission mechanism in this embodiment of this application is mainly applied to an antenna, and is configured to transmit power of a drive motor to an antenna array phase shifter in the antenna. The antenna in this embodiment of this application includes a first antenna array phase shifter 100 and a second antenna array phase shifter 110. The first driven gear set in the first transmission structure is configured to be in a transmission connection to the first antenna array phase shifter 100. The second driven gear 50 in the second transmission structure is configured to be in a transmission connection to the second antenna array phase shifter 110.

In an embodiment of this application, transmission between both the first driving gear and the second driving gear 30 and the drive shaft 10 is implemented through a worm gear. The transmission between both the first driving gear 20 and the second driving gear 30 and the drive shaft 10 is implemented through transmission of the worm gear. This arrangement is conducive to fully using space and changing the transmission direction of the power.

As shown in FIG. 3 and FIG. 4, a first turbine 21 is disposed on the first driving gear 20, a worm 120 is disposed at one end of the drive shaft 10, and the first driving gear 20 is in a transmission connection to the drive shaft 10 through the worm gear. A half-circle of first driving gear teeth 22 are disposed on an upper surface of the first driving gear 20. First driven gears 40 meshing with the first driving gear teeth 22 are separately disposed on two sides of the first driving gear 20. The two first driven gears 40 are connected to the first transmission shaft 60 in a non-relatively rotatable manner. Both the first driven gears 40 can be fixedly disposed on the first transmission shaft 60. One or more groups of non-relatively rotatable output gears 80 are disposed on the first transmission shaft 60. The output gears 80 mesh with the first antenna array phase shifter 100. A quantity of the output gears 80 is related to a quantity of array phase shifters on the first antenna array phase shifters 100.

When the drive shaft 10 rotates in the preset direction, the drive shaft 10 drives the first driving gear 20 to rotate through a worm gear structure. In a process in which the first driving gear rotates for one circle, the two first driven gears 40 are driven to rotate, and rotation directions of the two first driven gears 40 are opposite. Because the two first driven gears 40 are fixed on the first transmission shaft 60, in the process in which the first driving gear 20 rotates for one circle, the first transmission shaft 60 first rotates forwardly and then reversely (or first rotates reversely and then forwardly). The output gear 80 on the first transmission shaft 60 drives the first antenna array phase shifter 100 to move. In a process in which the first driving gear 20 rotates for one circle, the first antenna array phase shifter 100 reciprocates, to adjust a phase of the antenna.

As shown in FIG. 3 and FIG. 5, a second turbine 31 is disposed on the second driving gear 30, a worm 120 is disposed on the other end of the drive shaft 10, and the second driving gear is in a transmission connection to the drive shaft 10 through a worm gear. Some second driving gear teeth 32 are disposed on upper surface of the second driving gear 30. In this embodiment of this application, an example in which a half-circle of the second driving gear teeth 32 are disposed on the upper surface of the second driving gear 30 is used for description. One side of the second driving gear 30 is provided with a second driven gear 50 meshing with the second driving gear teeth 32, and the second driven gear 50 is fixedly connected to a second transmission shaft 70. One or more groups of non-relatively rotatable output gears 80 are disposed on the second transmission shaft 70. The output gears 80 mesh with the second antenna array phase shifters 110. A quantity of the output gears 80 is related to a quantity of array phase shifters on the second antenna array phase shifters 110.

When the drive shaft 10 rotates in the preset direction, the drive shaft 10 drives the second driving gear 30 to rotate through a worm gear structure. Because the upper surface of the second driving gear 30 is provided with only a half-circle of second driving gear teeth 32, when the second driving gear 30 rotates for one circle, the second driving gear 30 and the second driven gear 50 are in a meshing state during a half-circle rotation, and the second driven gear 50 is driven to rotate. The second driven gear 50 drives the second transmission shaft 70 to rotate, and the output gear 80 disposed on the second transmission shaft 70 drives the second antenna array phase shifter 110 to move. Because only one second transmission gear is disposed, a direction of the second transmission shaft 70 is only related to a rotation direction of the drive shaft 10. To be specific, when the direction of the drive shaft 10 is determined, a rotation direction of the second transmission shaft 70 is determined, and a movement direction of the second antenna array phase shifter 110 is determined and is unidirectional. During the other half-circle rotation, no gear teeth of the second driving gear 30 meshes with the second driven gear 50, the second driving gear 30 and the second driven gear 50 are in a separated state, the second driven gear 50 is stopped to rotate, and the second antenna array phase shifter 110 is also in a stopped state. Therefore, a displacement status of the second antenna array phase shifter 110 is related to a length of the second driving gear teeth 32 disposed on the second driving gear 30.

In this embodiment of this application, a rotation direction of the drive shaft 10 can be adjusted, for example, the drive shaft 10 is adjusted to rotate in a direction opposite to the preset direction. To be specific, the first antenna array phase shifter 100 and the second antenna array phase shifter 110 can be adjusted for reverse movement.

In this embodiment of this application, to fix the first transmission structure and the second transmission structure, a corresponding fixing base is further disposed. Specifically, a first upper fixing base 131 and a first lower fixing base 132 are provided for fixing the first transmission structure. A second upper fixing base 141 and a second lower fixing base 142 are provided for fixing the second transmission structure. A bolt structure can be used to connect the first upper fixing base 131 and the first lower fixing base 132. The bolt structure can be used to connect the second upper fixing base 141 and the second lower fixing base 142. Internal structures of the first upper fixing base 131 and the first lower fixing base 132 are adapted to the first transmission structure.

Internal structures of the second upper fixing base 141 and the second lower fixing base 142 are adapted to the second transmission structure.

In an embodiment of this application, the first driving gear 20 and the second driving gear 30 have a same specification. The first driving gear 20 and the second driving gear 30 are set to have the same specification, a layout is convenient, and an adjustment amplitude of the array phase shifter is easily controlled.

In an embodiment of this application, both the first driven gear 40 and the second driven gear 50 are bevel gears. The first driven gear 40 and the second driven gear 50 are set as bevel gears, so that the first driven gear 40 can be better matched with the first driving gear teeth 22 on the first driving gear 20, and the second driven gear 50 can be better matched with the second driving gear teeth 32 on the second driving gear 30, the bevel gear may change a transmission direction of power, to facilitate a structural layout based on positions of the drive shaft 10 and the array phase shifter.

Based on a same invention concept, an embodiment of this application provides an antenna. The antenna includes a first antenna array phase shifter 100, a second antenna array phase shifter 110, and an antenna gearbox transmission mechanism according to any embodiment. The first antenna array phase shifter 100 is in a transmission connection to a first driven gear set. The second antenna array phase shifter 110 is in a transmission connection to the second driven gear 50. For transmission connection structures in which the first antenna array phase shifter 100 is in a transmission connection to the first driven gear set, and the second antenna array phase shifter 110 is in a transmission connection to the second driven gear 50, refer to content described in the foregoing embodiment. The foregoing antenna has a same technical effect as the antenna gearbox transmission mechanism according to the foregoing embodiment, and details are not described herein again.

Embodiments in the specification are all described in a progressive manner. For same or similar parts in embodiments, reference may be made to these embodiments, and each embodiment focuses on a difference from other embodiments.

Although embodiments of this application have been described, persons skilled in the art may make other changes and modifications to these embodiments once they learn the basic inventive concept. Therefore, the appended claims are intended to be construed as including embodiments and all changes and modifications that fall within the scope of embodiments of this application.

Finally, it should be noted that, in this context, relational terms such as first and second are merely used to distinguish one entity or operation from another entity or operation, and do not necessarily indicate or imply any such actual relationship or order between these entities or operations. Moreover, the terms "include", "comprise", and any variation thereof are intended to cover a non-exclusive inclusion. Therefore, a process, method, article, or terminal device that includes a series of elements not only includes such elements, but also includes other elements not specified expressly, or further includes inherent elements of the process, method, article, or terminal device. If no more limitations are made, an element limited by "include a/an . . . " does not exclude other same elements existing in the process, the method, the article, or the terminal device which includes the element.

The foregoing describes in detail an antenna gearbox transmission mechanism and an antenna according to this application. Specific examples are used in this specification to describe principles and implementations of this application. Descriptions in the foregoing embodiments are merely used to help understand the method and a core idea of this application. In addition, persons of ordinary skill in the art may make modifications to the specific implementations and the application scope according to the idea of this application. In conclusion, the content of this specification shall not be construed as a limitation on this application.

What is claimed is:

1. An antenna gearbox transmission mechanism, comprising:
- a drive shaft;
- a first transmission structure; and
- a second transmission structure, wherein
- the first transmission structure comprises a first driving gear and a first driven gear set, the second transmission structure comprises a second driving gear and a second driven gear,
- both the first driving gear and the second driving gear are in a transmission connection to the drive shaft,
- the first driven gear set is configured to be in a first transmission connection to a first antenna array phase shifter,
- the second driven gear is configured to be in a second transmission connection to a second antenna array phase shifter,
- the first driving gear meshes with the first driven gear set,
- the second driving gear has a part without gear teeth and a part with gear teeth, and
- in response to a movement of the second driving gear, the second driving gear meshes with or is not meshed with the second driven gear.

2. The transmission mechanism according to claim 1, wherein
- the first driven gear set comprises a first driven gear, and
- in response to the drive shaft unidirectionally rotating in one preset direction,
  - the first driven gear first rotates in a reverse direction and then rotates in a forward direction, and
  - the second driven gear unidirectionally rotates in only one direction which is either a forward direction or a reverse direction.

3. The transmission mechanism according to claim 1, wherein
- the first driven gear set comprises a first driven gear, and
- in response to the drive shaft unidirectionally rotating in one preset direction,
  - the first driven gear first rotates in a forward direction and then rotates in a reverse direction, and
  - the second driven gear unidirectionally rotates in only one direction which is either a forward direction or a reverse direction.

4. The transmission mechanism according to claim 1, wherein
- both the first driving gear and the second driving gear are racks,
- in response to the drive shaft unidirectionally rotating in one preset direction, the first driving gear and the second driving gear move synchronously and linearly, and
- a rack length along which gear teeth of the first driving gear are arranged is greater than a rack length along which the gear teeth of the second driving gear are arranged.

5. The transmission mechanism according to claim 4, wherein the first driving gear is a rectangular rack having opposite first and second sides, and comprises a forward rack and a reverse rack, the forward rack is arranged on the first side of the rectangular rack, and has gear teeth projecting towards the reverse rack, the reverse rack is arranged on the second side of the rectangular rack, and has gear teeth projecting towards the forward rack, and the second driving gear comprises a forward rack or a reverse rack.

6. The transmission mechanism according to claim 4, wherein the first driving gear and the second driving gear are integrally formed.

7. The transmission mechanism according to claim 6, further comprising:

a connecting block disposed on at least one of the first driving gear or the second driving gear, wherein the connecting block is threadedly connected to the drive shaft.

8. The transmission mechanism according to claim 1, wherein the first driven gear set comprises two first driven gears disposed symmetrically relative to a center of the first driving gear, the first driving gear comprises a half-circle of gear teeth meshing with one of the two first driven gears at a time, and a total length of the part of the second driving gear with the gear teeth is less than a circumference of the second driving gear.

9. The transmission mechanism according to claim 8, wherein the two first driven gears and the second driven gear are bevel gears.

10. The transmission mechanism according to claim 8, wherein the transmission connection between the first driving gear and the drive shaft comprises a first worm gear, and the transmission connection between the second driving gear and the drive shaft comprises a second worm gear.

11. The transmission mechanism according to claim 1, wherein the first transmission structure further comprises:

a first transmission shaft connected to the first driven gear set; and one or more pairs of first output gears disposed on the first transmission shaft to drive the first antenna array phase shifter, and the second transmission structure further comprises:

a second transmission shaft connected to the second driven gear; and one or more pairs of second output gears disposed on the second transmission shaft to drive the second antenna array phase shifter.

12. An antenna, comprising:

a first antenna array phase shifter;

a second antenna array phase shifter; and an antenna gearbox transmission mechanism, wherein the antenna gearbox transmission mechanism comprises:

a drive shaft;

a first transmission structure; and a second transmission structure, wherein the first transmission structure comprises a first driving gear and a first driven gear set, the second transmission structure comprises a second driving gear and a second driven gear, both the first driving gear and the second driving gear are in a transmission connection to the drive shaft, the first driven gear set is in a first transmission connection to the first antenna array phase shifter, the second driven gear is in a second transmission connection to the second antenna array phase shifter, the first driving gear meshes with the first driven gear set, the second driving gear has a part without gear teeth and a part with gear teeth, and in response to a movement of the second driving gear, the second driving gear meshes with or is not meshed with the second driven gear.

13. The antenna according to claim 12, wherein the first driven gear set comprises a first driven gear, and in response to the drive shaft unidirectionally rotating in one preset direction, the first driven gear first rotates in a reverse direction and then rotates in a forward direction, and the second driven gear unidirectionally rotates in only one direction which is either a forward direction or a reverse direction.

14. The antenna according to claim 12, wherein the first driven gear set comprises a first driven gear, and in response to the drive shaft unidirectionally rotating in one preset direction, the first driven gear first rotates in a forward direction and then rotates in a reverse direction, and the second driven gear unidirectionally rotates in only one direction which is either a forward direction or a reverse direction.

15. The antenna according to claim 12, wherein both the first driving gear and the second driving gear are racks, in response to the drive shaft unidirectionally rotating in one preset direction, the first driving gear and the second driving gear move synchronously and linearly, and a rack length along which gear teeth of the first driving gear are arranged is greater than a rack length along which the gear teeth of the second driving gear are arranged.

16. The antenna according to claim 15, wherein the first driving gear is a rectangular rack having opposite first and second sides, and comprises a forward rack and a reverse rack, the forward rack is arranged on the first side of the rectangular rack, and has gear teeth projecting towards the reverse rack, the reverse rack is arranged on the second side of the rectangular rack, and has gear teeth projecting towards the forward rack, and the second driving gear comprises a forward rack or a reverse rack.

17. The antenna according to claim 15, wherein the first driving gear and the second driving gear are integrally formed.

18. The antenna according to claim 12, wherein the first driven gear set comprises two first driven gears disposed symmetrically relative to a center of the first driving gear, the first driving gear comprises a half-circle of gear teeth meshing with one of the two first driven gears at a time, and a total length of a part of the second driving gear having the gear teeth thereon is less than a circumference of the second driving gear.

19. The transmission mechanism according to claim 1, wherein in response to a rotation of the drive shaft, the second driving gear moves between a first position where the gear teeth of the second driving gear mesh with the second driven gear, and a second position where the second driving gear has no gear teeth meshing with the second driven gear.

20. An antenna gearbox transmission mechanism, comprising:

a drive shaft;

a first transmission structure; and a second transmission structure, wherein the first transmission structure comprises a first driving gear and a first driven gear, the second transmission structure comprises a second driving gear and a second driven gear, both the first driving gear and the second driving gear are in a transmission connection to the drive shaft, the first driven gear is configured to be connected to a first antenna array phase shifter, the second driven gear is configured to be connected to a second antenna array phase shifter, both the first driving gear and the second driving gear are racks, the first driving gear has opposite first and second sides, and comprises a first rack and a second rack, the first rack is arranged on the first side and has gear teeth projecting towards the second rack, the second rack is arranged on the second side and has gear teeth projecting towards the first rack, the second driving gear comprises a third rack, and in response to a rotation of the drive shaft, the first driving gear and the second driving gear move synchronously and linearly between a first position where gear teeth of the first rack of the first driving gear mesh with the first driven gear, and gear teeth of the third rack of the second driving gear mesh with the second driven gear, and a second position where gear teeth of the second rack of the first driving gear mesh with the first driven gear, and the second driving gear has no gear teeth meshing with the second driven gear.

* * * * *